US010755120B2

United States Patent
Fu et al.

(10) Patent No.: US 10,755,120 B2
(45) Date of Patent: Aug. 25, 2020

(54) END-TO-END LIGHTWEIGHT METHOD AND APPARATUS FOR LICENSE PLATE RECOGNITION

(71) Applicant: Beijing University of Posts and Telecommunications, Beijing (CN)

(72) Inventors: Huiyuan Fu, Beijing (CN); Huadong Ma, Beijing (CN); Yifan Zhang, Beijing (CN); Yu Cao, Beijing (CN); Dengkui Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 133 days.

(21) Appl. No.: 16/136,128

(22) Filed: Sep. 19, 2018

(65) Prior Publication Data
US 2019/0095730 A1    Mar. 28, 2019

(30) Foreign Application Priority Data
Sep. 25, 2017 (CN) .......................... 2017 1 0875708

(51) Int. Cl.
*G06K 9/00* (2006.01)
*G06K 9/46* (2006.01)
(Continued)

(52) U.S. Cl.
CPC ....... *G06K 9/00825* (2013.01); *G06K 9/3258* (2013.01); *G06K 9/46* (2013.01);
(Continued)

(58) Field of Classification Search
CPC ............. G06K 9/00825; G06K 9/6271; G06K 9/3258; G06K 9/46; G06K 9/3241;
(Continued)

(56) References Cited

U.S. PATENT DOCUMENTS 6,339,651 B1 * 1/2002 Tian ...................... G06K 9/344
340/10.1
6,473,517 B1 * 10/2002 Tyan ...................... G06K 9/344
382/105
(Continued)

FOREIGN PATENT DOCUMENTS

| CN | 104036241 A | 9/2014 |
| CN | 105046196 A | 11/2015 |

(Continued)

OTHER PUBLICATIONS

First Office Action for Chinese Patent Application No. 201710875708.5 dated Mar. 17, 2020; 6 pgs.
(Continued)

*Primary Examiner* — Aaron W Carter
(74) *Attorney, Agent, or Firm* — Umberg Zipser LLP

(57) ABSTRACT

Embodiments of the present invention provide an end-to-end lightweight method and apparatus for license plate recognition. The method comprises: obtaining an image to be recognized; obtaining a number of a license plate in the image to be recognized and position coordinates of the license plate in the image to be recognized on the basis of the image to be recognized and a pre-trained target license plate recognition model, wherein the target license plate recognition model comprises a target feature extraction network, a target region candidate localization network, a target super-resolution generation network and a target recurrent neural network. Because in this solution, once an image to be recognized is input into the target license plate recognition model, the target license plate recognition model can output the license plate number and position coordinates of the license plate in the image to be recognized, one realizes an end-to-end model. The model has relatively strong robustness, and it can detect and recognize pictures taken under different camera angles. Moreover, computation vari-
(Continued)

ables such as image features can be reused without repeated computations, the model takes up less RAM and the speed of license plate recognition is greatly improved.

18 Claims, 5 Drawing Sheets

(51) Int. Cl.
  *G06N 3/08* (2006.01)
  *G06T 3/40* (2006.01)
  *G06K 9/32* (2006.01)
  *G06K 9/62* (2006.01)
(52) U.S. Cl.
  CPC .......... *G06K 9/6271* (2013.01); *G06N 3/084* (2013.01); *G06T 3/4053* (2013.01); *G06K 2209/15* (2013.01)
(58) Field of Classification Search
  CPC . G06K 2209/15; G06T 3/4053; G06T 3/4046; G06N 3/084; G06N 3/0445
  See application file for complete search history.

(56) References Cited

U.S. PATENT DOCUMENTS

| | | | | |
|---|---|---|---|---|
| 6,553,131 | B1* | 4/2003 | Neubauer | G06K 9/32 |
| | | | | 382/105 |
| 9,083,856 | B2* | 7/2015 | Kozitsky | H04N 7/18 |
| 10,032,072 | B1* | 7/2018 | Tran | H04N 5/23229 |
| 10,614,557 | B2* | 4/2020 | Lin | G06N 3/0472 |
| 2005/0259866 | A1* | 11/2005 | Jacobs | G06K 9/00463 |
| | | | | 382/157 |
| 2012/0051667 | A1* | 3/2012 | Kang | G06T 3/4053 |
| | | | | 382/299 |
| 2012/0148101 | A1* | 6/2012 | Yoon | G06K 9/325 |
| | | | | 382/103 |
| 2014/0355836 | A1 | 12/2014 | Kozitsky et al. | |
| 2014/0369566 | A1* | 12/2014 | Chigos | G06K 9/325 |
| | | | | 382/105 |
| 2016/0203380 | A1* | 7/2016 | Bulan | G06K 9/3258 |
| | | | | 382/105 |
| 2016/0217263 | A1* | 7/2016 | Sawada | G06T 7/0012 |
| 2017/0177965 | A1* | 6/2017 | Gordo Soldevila | |
| | | | | G06K 9/4628 |
| 2017/0249524 | A1* | 8/2017 | Bulan | G06K 9/00771 |
| 2017/0349139 | A1* | 12/2017 | Zhang | B60R 25/01 |
| 2018/0060684 | A1* | 3/2018 | Ma | G06K 9/6215 |
| 2019/0050681 | A1* | 2/2019 | Tate | G06T 7/60 |
| 2019/0095730 | A1* | 3/2019 | Fu | G06K 9/6271 |
| 2019/0228276 | A1* | 7/2019 | Lei | G06N 3/08 |
| 2019/0251369 | A1* | 8/2019 | Popov | G06K 9/342 |
| 2019/0272438 | A1* | 9/2019 | Liu | G06K 9/342 |
| 2020/0090506 | A1* | 3/2020 | Chen | G06K 9/3241 |

FOREIGN PATENT DOCUMENTS

| | | |
|---|---|---|
| CN | 106897770 A | 6/2017 |
| CN | 106980854 A | 7/2017 |

OTHER PUBLICATIONS

Shi et al., "An End-to-End Trainable Neural Network for Image-Based Sequence Recognition and Its Application to Scene Text Recognition," IEEE Transactions on Pattern Analysis and Machine Intelligence; Jul. 21, 2015; 9 pgs.

* cited by examiner

END-TO-END LIGHTWEIGHT METHOD AND APPARATUS FOR LICENSE PLATE RECOGNITION

CROSS REFERENCE TO RELATED APPLICATION

The present application claims the priority to a Chinese patent application No. 201710875708.5, filed with the State Intellectual Property Office of the People's Republic of China on Sep. 25, 2017 and entitled "END-TO-END LIGHTWEIGHT METHOD AND APPARATUS FOR LICENSE PLATE RECOGNITION", which is hereby incorporated into the present application by reference in its entirety.

TECHNICAL FIELD

The present invention relates to the field of image processing technology, and in particular to an end-to-end lightweight method and apparatus for license plate recognition.

BACKGROUND

License plate recognition technology is the basis for intelligent transportation. In recent years, with the development of the digital image processing, pattern recognition and artificial intelligence technology, the license plate recognition technology is also developing continuously.

Generally, a license plate recognition process comprises the following three steps: license plate localization, character segmentation, and character recognition. Those three steps are implemented by a plurality of deep learning models. For example, during the license plate localization, the feature extraction is performed on an image to be recognized by means of a feature extraction model to obtain a feature map, and the position of a candidate box is determined by means of a region candidate localization model. A character recognition deep learning model segments characters and recognizes characters based on the feature map and the candidate box.

In the license plate recognition process described above, because the plurality of deep learning models exist independently, many redundant computations take place when operations are performed by means of the deep learning models, resulting in a large amount of redundant computational variables. For example, in the license plate localization process, a convolution operation is required to extract image features. However, the same convolution operation is usually required to extract image features during character segmentation and character recognition as well. These features become redundant computational variables. Because the large amount of redundant computational variables take up a large amount of RAM, and meanwhile there are redundant computations, the speed of license plate recognition is low.

SUMMARY

An objective of the embodiments of the present invention is to provide an end-to-end lightweight method and apparatus for license plate recognition to reduce redundant computations and improve the speed of license plate recognition. Specifically, the technical solution is as follows.

In the first aspect, an embodiment of the present invention provides an end-to-end lightweight method for license plate recognition. The method comprises:

obtaining an image to be recognized;

obtaining a number of a license plate in the image to be recognized and position coordinates of the license plate in the image to be recognized on the basis of the image to be recognized and a pre-trained target license plate recognition model, wherein, the target license plate recognition model comprises a target feature extraction network, a target region candidate localization network, a target super-resolution generation network and a target recurrent neural network, the process of obtaining a license plate number in the image to be recognized and position coordinates of the license plate in the image to be recognized comprising:

inputting the image to be recognized into the target feature extraction network and performing a first preset convolution operation on the image to be recognized to obtain a feature map;

inputting the feature map into the target region candidate localization network, and performing a second preset convolution operation on the feature map to obtain coordinates of a candidate box;

inputting the coordinates of the candidate box and the feature map into the target super-resolution generation network, and generating a super-resolution license plate image based on the coordinates of the candidate box and the feature map;

inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

Optionally, inputting the coordinates of the candidate box and the feature map into the target super-resolution generation network and generating a super-resolution license plate image based on the coordinates of the candidate box and the feature map, comprises:

inputting the coordinates of the candidate box and the feature map into the target super-resolution generation network;

extracting features of the license plate from a region in the feature map corresponding to the coordinates of the candidate box;

generating a super-resolution license plate image based on the extracted features of the license plate.

Optionally, the process of training the target license plate recognition model comprises:

constructing an initial license plate recognition model, wherein the initial license plate recognition model comprises an initial feature extraction network, an initial region candidate localization network, an initial super-resolution generation network and an initial recurrent neural network;

obtaining image samples, and recording position coordinates and number of the license plate in each of the image samples;

inputting the image samples into the initial feature extraction network, and performing a first preset convolution operation on the image samples to obtain a feature map sample corresponding to each of the image samples;

inputting the feature map sample corresponding to each of the image samples into the initial region candidate localization network to obtain predicted position coordinates;

adjusting parameters of the initial feature extraction network, and of the initial region candidate localization network based on the differences between the recorded position coordinates and the predicted position coordinates, and obtaining the target feature extraction network and the target region candidate localization network when the number of iterations reaches a first preset number of times;

inputting each of the image samples into the target feature extraction network to obtain a target feature map sample corresponding to each of the image samples, and inputting the target feature map samples into the target region candidate localization network to obtain target position coordinates;

inputting the target feature map samples and the target position coordinates into the initial super-resolution generation network to obtain predicted super-resolution images;

adjusting parameters of the initial super-resolution generation network based on the degree of differences between the predicted super-resolution images and real license plates, and obtaining the target super-resolution generation network when the number of iterations reaches a second preset number of times;

inputting the target feature map sample and target position coordinates corresponding to each of the image samples into the target super-resolution generation network to obtain a super-resolution license plate image sample corresponding to each of the image samples;

inputting the super-resolution license plate image samples into the initial recurrent neural network to obtain predicted license plate numbers;

adjusting parameters of the initial recurrent neural network based on the degree of differences between the recorded numbers and the predicted license plate numbers, and finishing the training and obtaining the target recurrent neural network when the number of iterations reaches a third preset number of times.

Optionally, before inputting the image samples into the initial feature extraction network, the method further comprises:

adjusting the size of the obtained image samples to obtain resized image samples;

inputting the image samples into the initial feature extraction network comprises:

inputting the resized image samples into the initial feature extraction network.

Optionally, the target feature extraction network is a lightweight feature extraction convolutional neural network.

In the second aspect, an embodiment of the present invention provides an end-to-end lightweight apparatus for license plate recognition. The apparatus comprises:

an image to be recognized obtaining module, configured for obtaining an image to be recognized;

a license plate recognition model, configured for obtaining a license plate number in the image to be recognized and position coordinates of the license plate in the image to be recognized on the basis of the image to be recognized and a target license plate recognition model that has been trained by a recognition model training module in advance, wherein the target license plate recognition model comprises a target feature extraction network, a target region candidate localization network, a target super-resolution generation network and a target recurrent neural network.

The license plate recognition model is specifically used for inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

Optionally, the license plate recognition model comprises:

a super-resolution image generation unit, configured for inputting the coordinates of the candidate box and the feature map into the target super-resolution generation network; extracting features of the license plate from a region in the feature map corresponding to the coordinates of the candidate box; generating a super-resolution license plate image based on the extracted features of the license plate.

Optionally, the recognition model training module comprises:

a recognition model constructing unit, configured for constructing an initial license plate recognition model, wherein the initial license plate recognition model comprises an initial feature extraction network, an initial region candidate localization network, an initial super-resolution generation network and an initial recurrent neural network;

an image sample obtaining unit, configured for obtaining image samples, and recording position coordinates and number of the license plate in each of the image samples;

a feature map sample obtaining unit, configured for inputting the image samples into the initial feature extraction network, and performing a first preset convolution operation on the image samples to obtain a feature map sample corresponding to each of the image samples;

a predicted position coordinate determining unit, configured for inputting the feature map sample corresponding to each of the image samples into the initial region candidate localization network to obtain predicted position coordinates;

a first parameter adjusting unit, configured for adjusting parameters of the initial feature extraction network and of the initial region candidate localization network based on the differences between the recorded position coordinates and the predicted position coordinates, and obtaining the target feature extraction network and the target region candidate localization network when the number of iterations reaches a first preset number of times;

a super-resolution image obtaining unit, configured for inputting the target feature map sample and target position coordinates corresponding to each of the image samples into the target super-resolution generation network to obtain a super-resolution license plate image sample corresponding to each of the image samples;

a second parameter adjusting unit, configured for adjusting parameters of the initial super-resolution generation network based on the degree of differences between the predicted super-resolution images and real license plates, and obtaining the target super-resolution generation network when the number of iterations reaches a second preset number of times;

a super-resolution license plate image sample obtaining unit, configured for inputting the feature map sample corresponding to each of the image samples into the target super-resolution generation network to obtain a super-resolution license plate image sample corresponding to each of the image samples;

a predicted license plate number determining unit, configured for inputting the super-resolution license plate image samples into the initial recurrent neural network to obtain predicted license plate numbers;

a third parameter adjusting unit, configured for adjusting parameters of the initial recurrent neural network based on the degree of differences between the recorded numbers and the predicted license plate numbers, and finishing the training and obtaining the target recurrent neural network when the number of iterations reaches a third preset number of times.

Optionally, the apparatus further comprises:

a size adjusting module, configured for adjusting the size of the obtained image samples, before inputting the image samples into the initial feature extraction network, to obtain resized image samples;

the feature map sample obtaining unit comprises:

a sample input subunit, configured for inputting the resized image samples into the initial feature extraction network.

Optionally, the target feature extraction network is a lightweight feature extraction convolutional neural network.

In the solution provided by the embodiments of the present invention, first, an image to be recognized is obtained; a license plate number in the image to be recognized and position coordinates of the license plate in the image to be recognized are obtained on the basis of the image to be recognized and a pre-trained target license plate recognition model, wherein the target license plate recognition model comprises a target feature extraction network, a target region candidate localization network, a target super-resolution generation network and a target recurrent neural network. The process of obtaining a license plate number in the image to be recognized and position coordinates of the license plate in the image to be recognized comprising: inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image. Because in this solution, once an image to be recognized is input into the target license plate recognition model, the target license plate recognition model can output the license plate number and position coordinates of the license plate in the image to be recognized, one realizes an end-to-end model. Moreover, computation variables such as image features can be reused without repeated computations, the model takes up less RAM, and the speed of license plate recognition is greatly improved.

BRIEF DESCRIPTION OF THE DRAWINGS

In order to explain the technical solutions of embodiments of the present invention or of the prior art more clearly, a brief description of the drawings required to be used in the description of the embodiments and of the prior art will be given below. Obviously, the drawings described below are just those of some embodiments of the present invention and other drawings may be obtained by those of ordinary skills in the art without any creative efforts based on these drawings.

DETAILED DESCRIPTION

The technical solution of the present invention will be described clearly and completely with reference to the drawings of embodiments of the present invention. Obviously, the embodiments described are merely some of the embodiments of the presnet invention, instead of all the embodiments. All other embodiments obtained by those of ordinary skills in the art based on the embodiments herein without any creative efforts are within the scope of protection of the present invention.

In order to reduce redundant computations in license plate recognition process and improve the speed of license plate recognition, embodiments of the present invention provide an end-to-end lightweight method, apparatus, electronic device and computer readable storage medium for license plate recognition.

First, an end-to-end lightweight method for license plate recognition provided by an embodiment of the present invention is described below.

The end-to-end lightweight method for license plate recognition provided by the embodiment of the present invention can be applied to any electronic device that needs to perform license plate recognition, hereafter referred to as an electronic device for short. The electronic device can be a computer, a tablet or other electronic devices, which is not limited herein.

Figure 1:
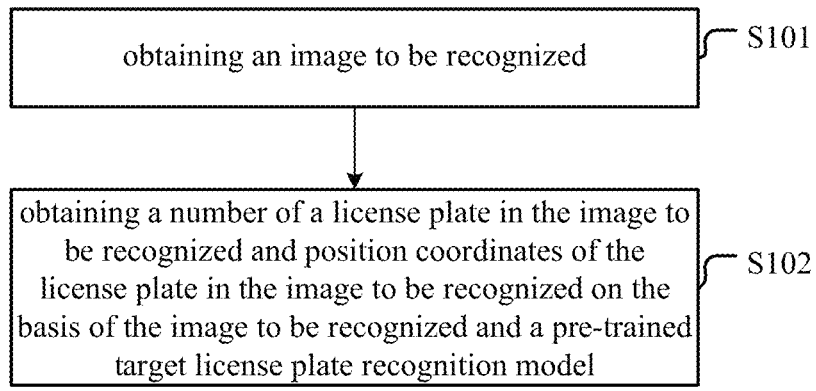
FIG. 1 is a flow chart of an end-to-end lightweight method for license plate recognition provided by an embodiment of the present invention.

FIG. 1 shows an end-to-end lightweight method for license plate recognition. The method comprises:

S101, obtaining an image to be recognized.

S102, obtaining a number of a license plate in the image to be recognized and position coordinates of the license plate in the image to be recognized on the basis of the image to be recognized and a pre-trained target license plate recognition model.

The target license plate recognition model comprises a target feature extraction network, a target region candidate localization network, a target super-resolution generation network and a target recurrent neural network. The process of obtaining a number of a license plate in the image to be recognized and position coordinates of the license plate in the image to be recognized comprises:

inputting the image to be recognized into the target feature extraction network and performing a first preset convolution operation on the image to be recognized to obtain a feature map;

inputting the feature map into the target region candidate localization network, and performing a second preset convolution operation on the feature map to obtain coordinates of a candidate box;

inputting the coordinates of the candidate box and the feature map into the target super-resolution generation network, and generating a super-resolution license plate image based on the coordinates of the candidate box and the feature map;

inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number and the coordinates of the candidate box.

As can be seen, in the solution provided by the embodiment of the present invention, the electronic device first obtains an image to be recognized, and obtains a number of a license plate in the image to be recognized and position coordinates of the license plate in the image to be recognized on the basis of the image to be recognized and a pre-trained target license plate recognition model. The process of obtaining a number of a license plate in the image to be recognized and position coordinates of the license plate in the image to be recognized comprises: inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image. Because in this solution, once an image to be recognized is input into the target license plate recognition model, the target license plate recognition model can output the license plate number and position coordinates of the license plate in the image to be recognized, realizing an end-to-end model. Moreover, computation variables such as image features can be reused without repeated computations, the model takes up less RAM and the speed of license plate recognition is greatly improved.

In the step S101 described above, the image to be recognized obtained by the electronic device is an image containing the license plate that needs to be recognized. The image to be recognized can be an image stored locally on the electronic device, and certainly can also be an image collected and sent by an image capturing device in communication connection with the electronic device. In a case where the image recognition needs to be performed in real time, such as for driverless cars, the image to be recognized can be an image collected and sent in real time by an image capturing device, which is appropriate.

After obtaining the image to be recognized, the electronic device can input the image to be recognized into the pre-trained target license plate recognition model. After processing by the target license plate recognition model, the license plate number in the image to be recognized and position coordinates of the license plate in the image to be recognized can be obtained. The target license plate recognition model can comprise a target feature extraction network, a target region candidate localization network, a target super-resolution generation network and a target recurrent neural network.

Figure 2:
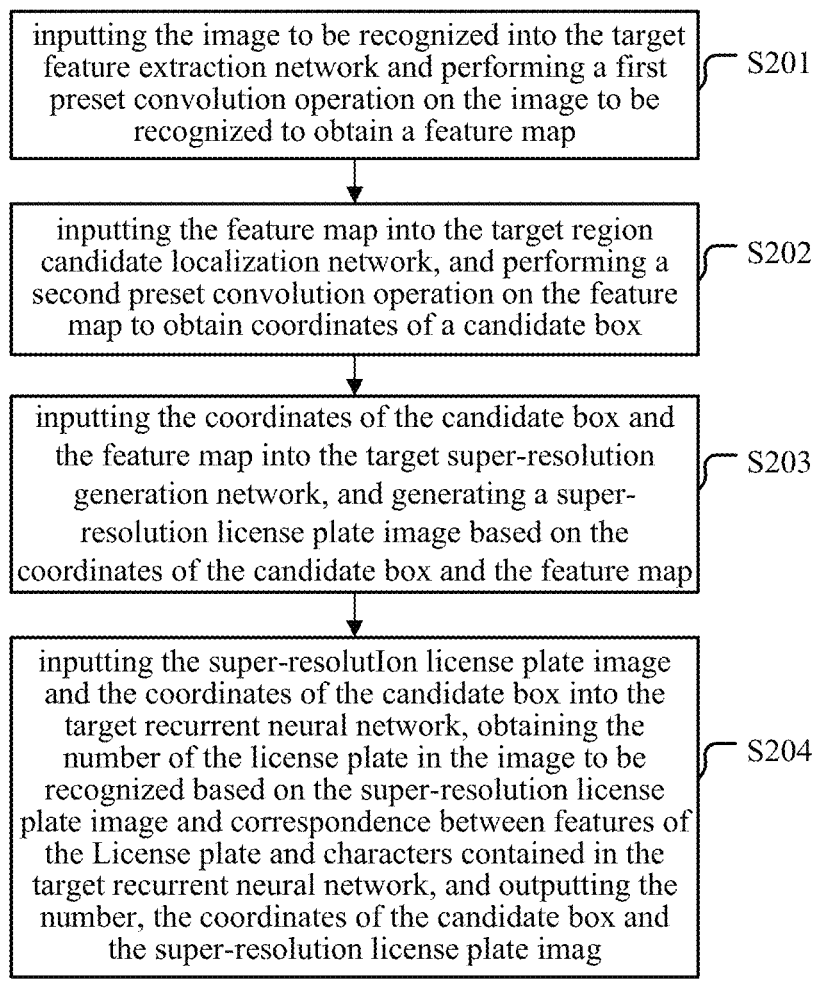
FIG. 2 is a specific flow chart of step S102 in the embodiment shown in FIG. 1.

Specifically, as shown in FIG. 2, the process of obtaining a license plate number in the image to be recognized and position coordinates of the license plate in the image to be recognized can comprise:

S201, inputting the image to be recognized into the target feature extraction network and performing a first preset convolution operation on the image to be recognized to obtain a feature map.

First, the image to be recognized is input into the target feature extraction network and the first preset convolution operation is performed to obtain a feature map. In one implementation, the target feature extraction network can be a lightweight feature extraction convolutional neural network, for example, a squeezeNet convolutional neural network can be used. It can be understood that the lightweight feature extraction convolutional neural network has relatively few connection parameters and is a lightweight neural network, and can extract image features of the image to be recognized more quickly. Moreover, it has lower hardware RAM requirement and is easy to deploy on a large scale.

The convolution kernel size and the step size of the first preset convolution operation can be set according to factors such as actual recognition needs, which are not specifically limited herein. For example, a convolutional layer having a convolution kernel size of (2*2) and a step size of (1*1) is used to perform the first preset convolution operation on the image to be recognized, so as to obtain a feature map of the image to be recognized. It can be understood that due to the characteristics of the convolution operation, relative positions among all the objects in the feature map are the same as those in the image to be recognized. The target feature extraction network may comprise a plurality of convolutional layers, a convolution operation is performed on the output of the previous convolutional layer respectively, and the feature map is generally the output of the last convolutional layer.

S202, inputting the feature map into the target region candidate localization network, and performing a second preset convolution operation on the feature map to obtain coordinates of a candidate box.

The target feature extraction network outputs the feature map, which is then input into the target region candidate localization network, and the target region candidate localization network determines coordinates of regions where the license plate may be located. A convolution scoring is performed on the determined coordinates, and finally coordinates of a candidate box of the entire feature map are output. The coordinates of the candidate box are the coordinates of the region with the highest score in the convolution scoring. The highest score indicates that the region is most likely to be a region where the license plate is located, and the coordinates of the region are the coordinates of the candidate box.

The convolution kernel size and the step size of the second preset convolution operation can be set according to factors such as actual recognition needs, which are not specifically limited herein. For example, a convolutional layer having a convolution kernel size of (3*3) and a step size of (2*2) is used to perform the second preset convolution operation on the image to be recognized, so as to obtain coordinates of the candidate box. In general, since the license plate is generally rectangular, the coordinates of the candidate box are the coordinates of two vertices of a diagonal of a rectangular box, and of course can also be the coordinates of four vertices of the rectangular box, which is not limited herein, as long as the location of the rectangular box can be determined.

S203, inputting the coordinates of the candidate box and the feature map into the target super-resolution generation network, and generating a super-resolution license plate image based on the coordinates of the candidate box and the feature map.

The coordinates of the candidate box and the feature map output by the target feature extraction network described above are input into the target super-resolution generation network, and the target super-resolution generation network can generate a super-resolution license plate image based on the coordinates of the candidate box and the feature map. In order to illustrate the solution clearly and for a clear layout, a specific implementation for generating a super-resolution license plate image will be described later.

In an implementation, the target super-resolution generation network can employ an architecture of a generative adversarial neural network. Due to its fast operation speed and high precision, the generative adversarial neural network can perform a super-resolution reconstruction on a license plate image collected in natural scenes that is not clear enough to obtain a super-resolution license plate image. In the super-resolution license plate image, features of the license plate are clear, which can make the subsequent identification result more accurate. In addition, the super-resolution license plate image output by the generative adversarial neural networks is normalized in size, which is more convenient for the recognition performed by the target recurrent neural networks subsequently.

S204, inputting the super-resolution license plate image and the coordinates of the candidate box into the target recurrent neural network, obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

The super-resolution license plate image output by the target super-resolution generation network and the coordinates of the candidate box output by the target region candidate localization network can be input into the target recurrent neural network. The target recurrent neural network can then recognize the super-resolution license plate image based on the correspondence between the features of the license plate and characters, so as to obtain the license plate number in the super-resolution license plate image, i.e. the license plate number in the image to be recognized, and then output the number and the coordinates of the candidate box. The process of license plate recognition is completed.

Specifically, in the target recurrent neural network, the coding model of LSTM (Long Short Term Memory) is applied as the basic model. The super-resolution license plate image described above is taken as an input to extract the features of the super-resolution license plate image, which in turn enter the coding unit of LSTM.

The first step in LSTM is to decide what information to be thrown away from the neuron cell state. This decision can be achieved by a forget gate layer. The forget gate layer can read the input of a previous memory sequence, and output a number between 0 and 1 for each number in the cell state, wherein 1 represents keep, while 0 represents throw away. The formula is as follows:

$$f_t = \sigma(W_f \cdot [h_{t-1}, x_t] + b_t)$$

wherein $f_t$ is the neuron's output at the t-th forget gate layer, $W_f$ is a connection parameter of the t-th forget gate layer, $h_{t-1}$ is the input at the (t–1)-th forget gate layer, $x_t$ is the input at the t-th forget gate layer, $b_t$ is the bias value of the t-th forget gate layer.

The next step is to decide what new information to be stored in the cell state. This generally has two parts. First, a sigmoid layer called the "input gate layer" decides which values need to be updated. Next, a tan h layer creates a vector of new candidate values that will be added to the cell state. The formulas are as follows:

$$i_t = \sigma(W_i \cdot [h_{t-1}, x_t] + b_i)$$
$$\tilde{C}t = \tanh(W_C \cdot [h_{t-1}, x_t] + b_c)$$

wherein C is the value of the neuron cell state, $i_t$ is a candidate value of a new state, $W_i$ is a candidate update parameter, $b_i$ is a candidate bias item, $W_C$ is an update parameter of the cell state, $b_C$ is a bias item of the cell state.

Next, the old cell state can be updated. As the previous steps described above already decided the parameters to throw away and parameters to update, and one need only perform operations for update and throwing away. Specifically, the old state value is multiplied by the connection parameter, throwing away the information that has been decided to be thrown away. The new candidate value is updated based on the degree to which each state has been decided to be updated. The formula is as follows:

$$C_t = f_t * C_{t-1} + i_t * \tilde{C}t$$

Finally, the output value needs to be decided. This output value is based on the cell state, and obtained after filtering. First, a sigmoid layer is created to decide what parts of the cell state to be output. Then, the cell state is processed through a tan h layer to obtain a value between −1 and 1, and it is multiplied by the output of the sigmoid layer to obtain the output value. The formulas determining the output value are as follows:

$$o_t = \sigma(W_o[h_{t-1}, x_t] + b_o)$$

$$h_t = o_t * \tanh(C_t)$$

wherein $O_t$ is a short memory connection parameter, σ is the sigmoid function, $W_o$ is a short memory output connection parameter, $b_o$ is a bias item.

Figure 3:
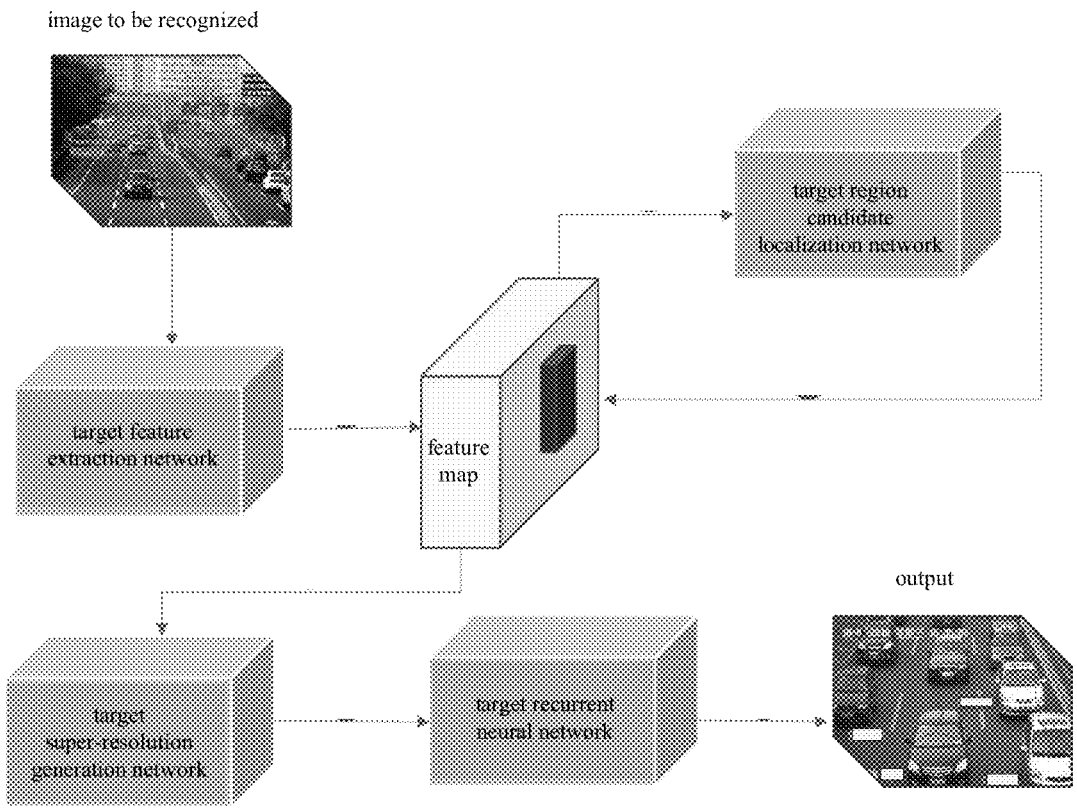
FIG. 3 is a schematic diagram of the process of license plate recognition in the embodiment shown in FIG. 1.

Through the approaches described above, the target recurrent neural network can obtain and output the number of the license plate in the image to be recognized based on the correspondence between the features of the license plate and characters contained in the target recurrent neural network, and the super-resolution license plate image. The schematic diagram of the license plate recognition process described above can be as shown in FIG. 3.

Figure 4:
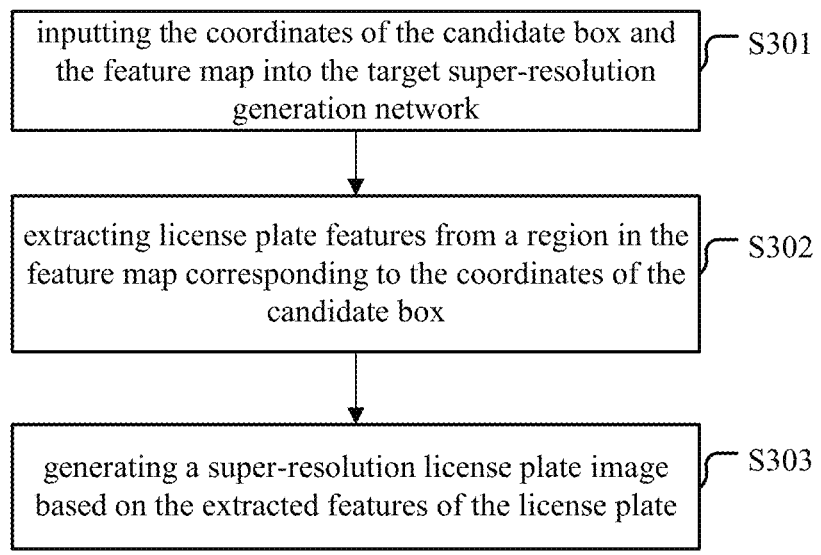
FIG. 4 is a specific flow chart of step S203 in the embodiment shown in FIG. 2.

As an implementation of the embodiment of the present invention, as shown in FIG. 4, the above-described step of inputting the coordinates of the candidate box and the feature map into the target super-resolution generation network, and generating a super-resolution license plate image based on the coordinates of the candidate box and the feature map, can comprise:

S301, inputting the coordinates of the candidate box and the feature map into the target super-resolution generation network.

First, the feature map output by the target feature extraction network and the coordinates of the candidate box output by the target region candidate localization network will be input into the target super-resolution generation network. The target super-resolution generation network can then process the feature map.

S302, extracting features of the license plate from a region corresponding to the coordinates of the candidate box in the feature map.

After the coordinates of the candidate box and the feature map are input into the target super-resolution generation network, the target super-resolution generation network can extract features of the license plate from the region corresponding to the coordinates of the candidate box in the feature map. For example, the coordinates of the candidate box are (x1, y1, x2, y2), wherein (x1, y1) and (x2, y2) are the coordinates of the two vertices of a diagonal of the rectangular box. The super-resolution generation network can extract features of the license plate from the rectangular region having two vertices with coordinates (x1, y1) and (x2, y2) in the feature map.

S303, generating a super-resolution license plate image based on the extracted features of the license plate.

The target super-resolution generation network can generate a super-resolution license plate image, i.e. a clear license plate image that is very close to a real license plate, based on the extracted features of the license plate.

In an implementation, the target super-resolution generation network can be a Generative Adversarial Network. In general, a generative adversarial network comprises an image generative model with the objective of generating an image with relatively high fidelity, and an image discriminative model that is able to correctly judge whether an image is a generated image or a real image. That is, the image discriminative model judges whether the image generated by the image generative model is real or not. During the training of the model, parameters of the target super-resolution generation network are adjusted until the image generative model and the image discriminative model cannot improve themselves, that is, the image discriminative model cannot judge whether the image generated by the image generative model is a generated image or a real image. At this point, the target super-resolution generation network can generate a super-resolution license plate image that is very similar to the real license plate.

Figure 5:
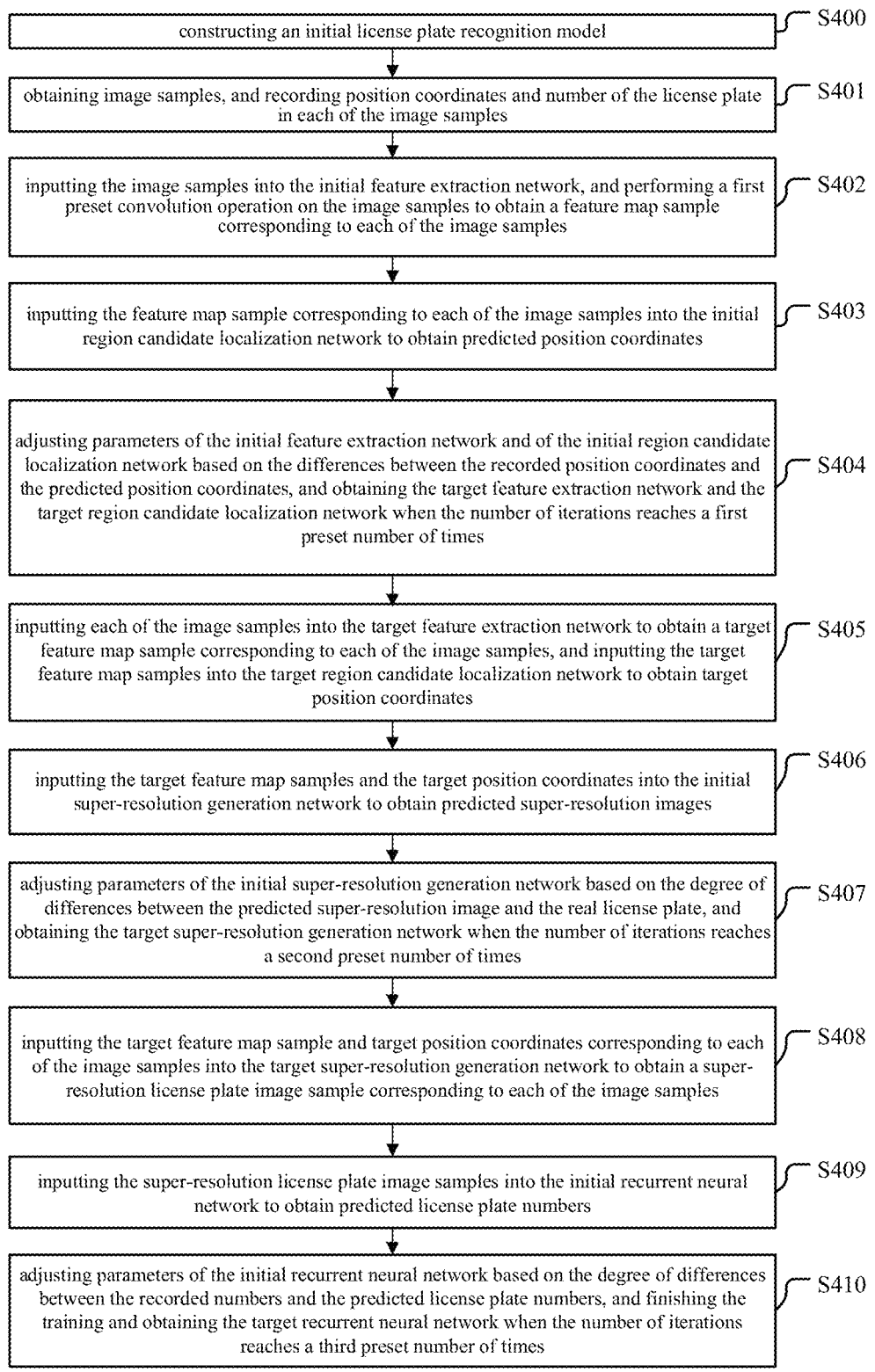
FIG. 5 is a flow chart of a method for training the target license plate recognition model in the embodiment shown in FIG. 1.

As an implementation of the embodiment of the present invention, as shown in FIG. 5, the above-described process of training the target license plate recognition model can comprise:

S400, constructing an initial license plate recognition model, wherein the initial license plate recognition model comprises an initial feature extraction network, an initial region candidate localization network, an initial super-resolution generation network and an initial recurrent neural network.

First, the electronic device can construct an initial license plate recognition model. The initial license plate recognition model comprises an initial feature extraction network, an initial region candidate localization network, an initial super-resolution generation network and an initial recurrent neural network.

Frameworks having a deep learning computation, such as Caffe, PyTorch can be used. The target license plate recognition model can be embedded into an image capturing device, such as a camera. Users can extract the license plate information, which is used as input of the target license plate recognition model, and the target license plate recognition model may output the best prediction result directly. The target license plate recognition model has no special requirements for operating hardware, and only frameworks having deep learning and computing systems are sufficient.

S401, obtaining image samples, and recording position coordinates and number of the license plate in each of the image samples.

The electronic device can obtain a large number of image samples for training the initial license plate recognition model. In order to ensure the detection accuracy of the target license plate recognition model obtained by training, the image samples can be collected under a condition that is the same as or similar to that of the image to be recognized.

After obtaining the image samples, the electronic device can record the position coordinates and number of the license plate in each of the image samples. That is, the electronic device can record the position coordinates and number of the license plate in each of the image samples. In order to facilitate the subsequent calculation of the differences between the recorded position coordinates and predicted position coordinates, the position coordinates can be coordinates of the rectangular box of the region where the license plate is located in the image sample. The coordinates of the rectangular box can be the coordinates of two vertices of a diagonal of the rectangular box, and of course can also be the coordinates of four vertices of the rectangular box, which is not limited herein as long as the position of the rectangular box can be determined.

The license plate number is the characters on the license plate, including texts and numbers.

S402, inputting the image samples into the initial feature extraction network, and performing a first preset convolution operation on the image samples to obtain a feature map sample corresponding to each of the image samples.

Next, the electronic device can input the image samples into the initial feature extraction network that has been constructed, and the initial feature extraction network performs the first preset convolution operation on the image samples to obtain a feature map sample corresponding to each of the image samples. The approach for extracting features from the image samples by the initial feature extraction network is the same as the above-described approach for extracting features from the image to be recognized by the target feature extraction network, which will not be described herein again.

S403, inputting the feature map sample corresponding to each of the image samples into the initial region candidate localization network to obtain predicted position coordinates.

After obtaining feature map samples, the feature map samples can be input into the initial region candidate localization network to obtain predicted position coordinates. Specifically, the initial region candidate localization network can perform a second preset convolution operation on the feature map samples to obtain the predicted position coordinates corresponding to each of the image samples.

The approach for processing the feature map samples by the initial region candidate localization network to obtain the predicted position coordinates is the same as the above-described approach for processing the feature map of the image to be recognized by the target region candidate localization network to obtain coordinates of a candidate box, which will not be described herein again.

S404, adjusting parameters of the initial feature extraction network and of the initial region candidate localization network based on the difference between the recorded position coordinates and the predicted position coordinates, and obtaining the target feature extraction network and the target region candidate localization network when the number of iterations reaches a first preset number of times.

After obtaining the predicted position coordinates corresponding to each of the image samples, the electronic device can calculate the difference between the recorded position coordinates and the predicted position coordinates, and then adjust the parameters of the initial feature extraction network and the initial region candidate localization network based on the difference. This difference can be a parameter that can indicate the deviation between the recorded position coordinates and the predicted position coordinates, such as the residual between the recorded position coordinates and the predicted position coordinates, which is not specifically limited herein.

After obtaining the difference, the parameters of the initial feature extraction network and the initial region candidate localization network can be adjusted by a backpropagation method. The specific implementation of the backpropagation method can be a backpropagation method in the prior art, which is not specifically limited and described herein.

Figure 6:
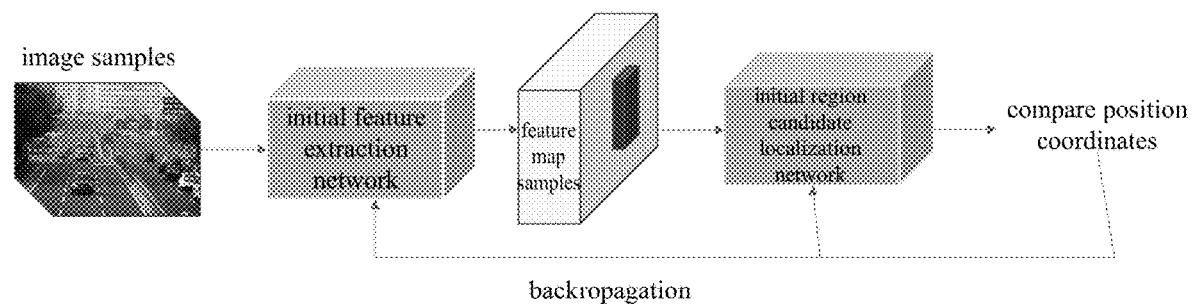
FIG. 6 is a schematic diagram of steps S401-S404 in the embodiment shown in FIG. 5.

Each of the feature map samples is input into the initial region candidate localization network to obtain its corresponding predicted position coordinates and then obtain a difference. The parameters of the initial feature extraction network and the initial region candidate localization network are adjusted once, which is called an iteration. When the number of iterations reaches the first preset number of times, which indicates that the number of times for adjusting the parameters of the initial feature extraction network and the initial region candidate localization network has reached the first preset number of times, the adjustment of the parameters of the initial feature extraction network and the initial region candidate localization network can be stopped, because generally at this point, the initial feature extraction network has become able to accurately extract features of an image, and the initial region candidate localization network has generally become able to accurately locate the position of a candidate box. The target feature extraction network and the target region candidate localization network are obtained. The first preset number of times can be for example 10 thousand, 20 thousand, 50 thousand, which is not limited herein. The schematic diagram of processes of steps S401-S404 described above can be as shown in FIG. 6.

S405, inputting each of the image samples into the target feature extraction network to obtain a target feature map sample corresponding to each of the image samples, and inputting the target feature map samples into the target region candidate localization network to obtain target position coordinates.

After the target feature extraction network and the target region candidate localization network are obtained, the target feature map sample corresponding to each of the image samples can be obtained by the target feature extraction network, and the target position coordinates corresponding to each of the image samples are obtained by the target region candidate localization network.

S406, inputting the target feature map samples and the target position coordinates into the initial super-resolution generation network to obtain a predicted super-resolution image.

Further, the electronic device can input the target feature map samples and the target position coordinates into the initial super-resolution generation network to obtain a predicted super-resolution image. The initial super-resolution generation network extracts features of the license plate from the corresponding target feature map samples based on the target position coordinates, and then generates a predicted super-resolution image. The specific approach for generating a predicted super-resolution image is the same as the approach for generating a super-resolution license plate image described above, which will not be described herein again.

S407, adjusting parameters of the initial super-resolution generation network based on a degree of difference between the predicted super-resolution images and the real license plate, and obtaining the target super-resolution generation network when the number of iterations reaches a second preset number of times.

After the above predicted super-resolution image is obtained, the electronic device can adjust the parameters of the initial super-resolution generation network based on the degree of difference between the predicted super-resolution images and real license plate. The degree of difference can be a parameter that can indicate the deviation between a predicted super-resolution image and a real license plate, such as the residual between a predicted super-resolution image and a real license plate, which is not specifically limited herein.

After the degree of difference is obtained, the parameters of the initial super-resolution generation network can be adjusted by a backpropagation method. The specific implementation of the backpropagation method can be a backpropagation method in the prior art, which is not specifically limited and described herein.

When the number of iterations reaches the second preset number of times, it indicates that the number of times for adjusting the parameters of the initial super-resolution generation network has reached the second preset number of times. Generally at this point, the initial super-resolution generation network has become able to generate a super-resolution license plate image with relatively high fidelity. Therefore, the adjustment of the parameters of the initial super-resolution generation network can be stopped and the target super-resolution generation network is obtained. The second preset number of times can be for example 10 thousand, 20 thousand, 50 thousand, which is not limited herein.

For example, the target super-resolution generation network can be a generative adversarial network, comprising an image generative model and an image discriminative model. The image generative model comprises a plurality of convolutional layers, and can obtain feature information of a feature map, without any limitation to the size of the feature map. After the plurality of convolutional layers, a deconvolutional layer can be further included that performs pixel-level reduction on the image and visualizes the image. The super-resolution license plate image generated in this way is a regular and readable image, which is convenient for subsequent license plate number recognition.

The purpose of the target super-resolution generation network is to obtain a super-resolution image (ISR) through super-resolution reconstruction of a low-resolution image (ILR), which is the low resolution version of the ISR. For an ILR and ISR with color channels of C, the ILR can be represented by a real matrix with a size of W×H×C, and the ISR can be represented by a real matrix with a size of rW×rH×C, wherein W is the width of the ILR and H is the height of the ILR, rW is the width of the ISR and rH is the height of the ISR, C is the number of the color channels, for example, for an ILR and ISR in RGB color format, C is 3.

The target super-resolution generation network is composed of an image generative model and an image discriminative model. The image generative model captures a distribution of sample data, and produces a training sample similar to the real data using a noise that obeys a certain distribution (such as uniform distribution, Gaussian distribution), the goal of which is to make the training sample as similar to the real data as possible. The image discriminative model may be a binary classifier used to estimate the probability that a sample comes from real data (rather than data generated). If the sample comes from real data, the image generative model outputs a high probability, otherwise the image generative model outputs a low probability. In the target license plate recognition model, the input of the image generative model may be a target feature map sample, and license plate data generated based on license plate features in the target feature map sample. The input of the image discriminative model may be generated license plate data and high-resolution license plate data generated manually in advance, both of which are discriminated by the image discriminative model. The image generative model and the image discriminative model are subjected to many iterations with each other, and finally the image generative model is able to generate more real license plate data, and the image discriminative model is able to better discriminate between generated license plate data and high-resolution license plate data.

In order to achieve the purpose of obtaining a super-resolution image through super-resolution reconstruction of a low-resolution image, a generation function G can be constructed for estimating a super-resolution image corresponding to a given low-resolution image. To determine the generative function G, a feedforward convolutional neural network $G_{\theta_G}$ with a parameter $\theta_G$ can be trained, wherein $\theta_G=\{W1:L; b1:L\}$ means the weight and the deviation of the L-th layer network, which can be obtained by optimizing the corresponding loss function of the super-resolution image. For given real license plates ISRn (n=1, 2 ... N) and corresponding ILRn (n=1, 2 ... N) i.e. the image samples described above, wherein N is a positive integer, the loss function can be expressed as:

$$\hat{\theta}_G = \mathrm{argmin}_{\theta_G} \frac{1}{N} \sum_{n=1}^{N} l^{SR}(G_{\theta_G}(I_n^{LR}), I_n^{HR})$$

wherein, $l^{SR}$ is a comparison function for a low-resolution image and a super-resolution image, $I_n^{LR}$ is the n-th low-resolution image, and $I_n^{HR}$ is the n-th super-resolution image.

In order to form a confrontation between the image discriminative model and the image generative model, a loss function D of the image discriminative model can be constructed as a non-passing expected characteristic of the generated super-resolution image, and this loss function is a weighted combination of several loss components. To determine the loss function D, a convolutional neural network $D_{\theta_D}$ with a parameter $\theta_D$ can be trained.

The feedforward convolutional neural networks $G_{\theta_G}$ and $D_{74\ D}$ are optimized alternately to solve the problem of minimum-maximum confrontation between the image generative model and the image discriminative model, which can be determined by the following formula specifically:

$$\min_{\theta_G}\max_{\theta_D} E_{I^{HR} \sim P_{train}}(I^{HR})[\log D_{\theta_D}(I^{HR})] +$$

$$E_{I^{LR} \sim P_G}(I^{LR})[\log(1 - D_{\theta_G}(G_{\theta_G}(I^{HR})))]$$

wherein $E_{I^{HR} \sim P_{train}}(I^{HR})$ represents the image discriminative model, and $E_{I^{LR} \sim P_G}(I^{LR})$ represents the image generative model.

Figure 7:
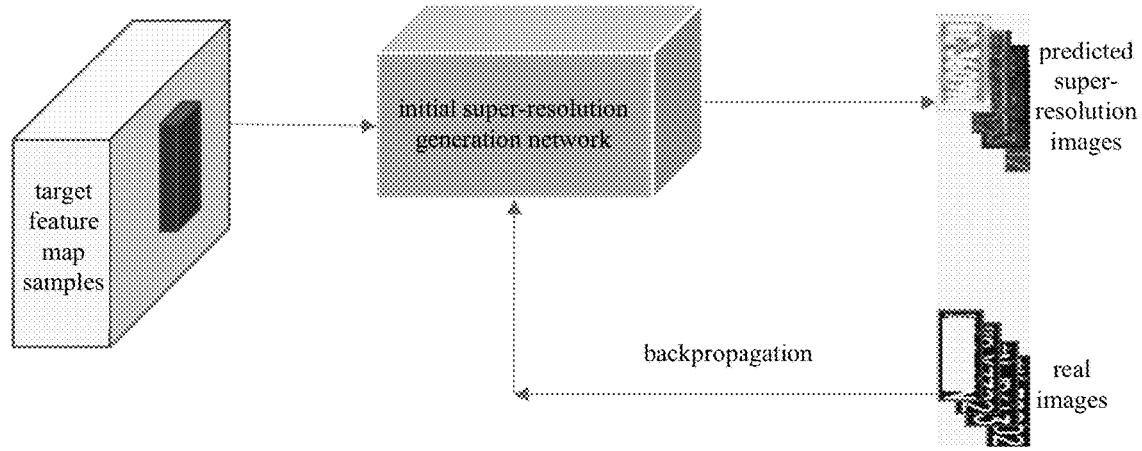
FIG. 7 is a schematic diagram of steps S405-S407 in the embodiment shown in FIG. 5.

In the way described above, the parameters of the initial super-resolution generation network are adjusted, and when the number of iterations reaches the second preset number of times, the target super-resolution generation network is finally optimized and obtained. The schematic diagram of the processes of steps S405-S407 described above can be as shown in FIG. 7.

S408, inputting a target feature map sample and target position coordinates corresponding to each of the image samples into the target super-resolution generation network to obtain a super-resolution license plate image sample corresponding to each of the image samples.

After the parameters of the target super-resolution generation network are determined, the electronic device can input a target feature map sample and target position coordinates corresponding to each of the image samples into the target super-resolution generation network to obtain a super-resolution license plate image sample corresponding to each of the image samples. It can be understood that the super-resolution license plate image sample obtained at this point is an image with a very small deviation from the real license plate, which can make the subsequently obtained target recurrent neural network more accurate.

S409, inputting the super-resolution license plate image samples into the initial recurrent neural network to obtain predicted license plate numbers.

Further, the electronic device can input the super-resolution license plate image samples described above into the initial recurrent neural network to obtain predicted license plate numbers. The approach for obtaining the predicted license plate numbers is the same as that for obtaining the license plate number in the image to be recognized as described above, which will not be described herein again.

S410, adjusting parameters of the initial recurrent neural network based on the degree of differences between the recorded numbers and the predicted license plate numbers, and finishing the training and obtaining the target recurrent neural network when the number of iterations reaches a third preset number of times.

After inputting the super-resolution license plate image samples, the initial convolutional neural network extracts image features through convolving and pooling operations. Due to time sequence characteristics, the license plate may be expressed as a feature vector by using Map-to-Sequence, the feature vector is recognized by using a bidirectional long and short term memory network to obtain a probability distribution of each column of features, and an optimal sequence is obtained by using CTC (Connectionist temporal classification) and a forward-backward algorithm.

After the predicted license plate numbers are obtained, the electronic device can calculate the degree of differences between the recorded numbers and the predicted license plate numbers, and then adjust the parameters of the initial recurrent neural network based on the degree of differences. The degree of difference can be a parameter that can indicate the deviation between a recorded number and a predicted license plate number, such as the residual between a recorded number and a predicted license plate number, which is not specifically limited herein.

After the degree of differences are obtained, the parameters of the initial recurrent neural network can be adjusted by a backpropagation method. The specific implementation of the backpropagation method can be a backpropagation method in the prior art, which is not specifically limited and described herein.

Figure 8:
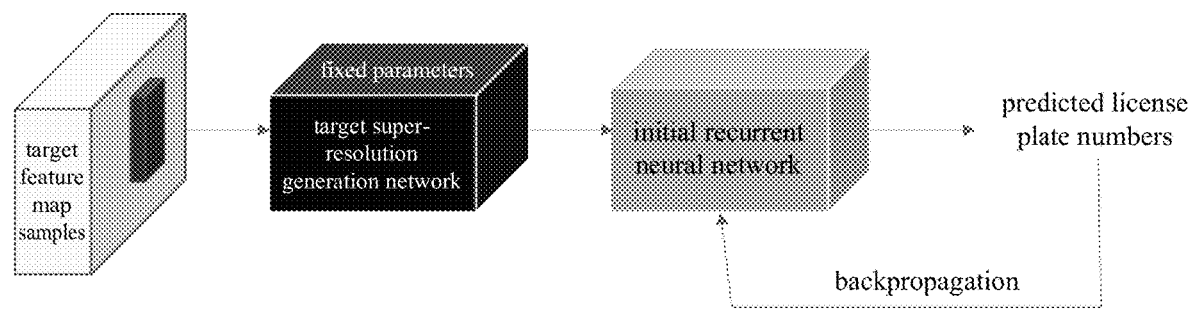
FIG. 8 is a schematic diagram of steps S408-S410 in the embodiment shown in FIG. 5.

When the number of iterations reaches the third preset number of times, it indicates that the number of times for adjusting the parameters of the initial recurrent neural network has reached the third preset number of times. Generally at this point, the initial recurrent neural network has already become able to recognize the license plate number in an image. Therefore, the adjustment of the parameters of the initial recurrent neural network can be stopped and the target recurrent neural network is obtained. The third preset number of times can be for example 10 thousand, 20 thousand, 50 thousand, which is not limited herein. The schematic diagram of the processes of steps S408-S410 described above can be as shown in FIG. 8.

In order to make license plate regions in the image samples have characteristics of various sizes and to improve the robustness of the target license plate recognition model for license plate regions with different sizes, as an implementation of the embodiment of the present invention, before the above-described step of inputting the image samples into the initial feature extraction network, the method described above can further comprise:

adjusting the size of the obtained image samples to obtain resized image samples.

The electronic device can resize the image samples. In an implementation, the electronic device can scale the obtained image samples to obtain image samples of different sizes. For example, the image samples can be scaled by a factor of 2, 3, 0.5, or the like.

Accordingly, inputting the image samples into the initial feature extraction network described above can comprise inputting the resized image samples into the initial feature extraction network.

The resized image samples are input into the initial feature extraction network so that the initial feature extraction network can learn the features of image samples with different sizes to a greater extent. Thus, the target feature extraction network obtained by training can extract features of image samples with different sizes, which improves the generalization ability of the target feature extraction network for image samples with different sizes.

As an implementation of the embodiment of the present invention, the above-described target feature extraction network can be a lightweight feature extraction convolutional neural network. As a lightweight neural network, the lightweight feature extraction convolutional neural network can extract image features of an image to be recognized more quickly. Moreover, it reduces hardware RAM requirements and is easy to deploy on a large scale.

In the above training process, a whole license plate recognition model, i.e. an initial license plate recognition model is constructed, wherein the image discriminative model is used to discriminate image data generated by the image generative model during training, and losses are reduced by mutual game, such that features of an license plate generated by the image generative model in a complex environment are more similar to features of an license plate in a general environment. In a practical use phase, a trained image generative model can reduce noises on a license plate with low resolution to generate a super-resolution license plate image, and the game with the image discriminative model is no longer needed. In a practical use phase, the image discriminative model can be removed, and the output of the image generative module is used as input of the target recurrent neural network to ultimately finish the license plate recognition.

Corresponding to the recognition method described above, an embodiment of the present invention provides an end-to-end lightweight apparatus for license plate recognition.

The end-to-end lightweight apparatus for license plate recognition provided by an embodiment of the present invention is described below.

Figure 9:
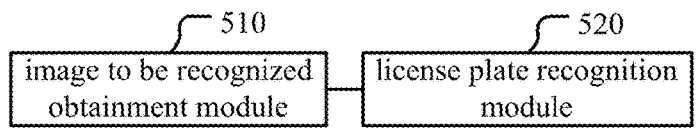
FIG. 9 is a structural schematic diagram of an end-to-end lightweight apparatus for license plate recognition provided by an embodiment of the present invention.

FIG. 9 shows the end-to-end lightweight apparatus for license plate recognition. The apparatus comprises:

an image to be recognized obtaining module 510, configured for obtaining an image to be recognized;

a license plate recognition model 520, configured for obtaining a license plate number in the image to be recognized and position coordinates of the license plate in the image to be recognized on the basis of the image to be recognized and a target license plate recognition model that has been trained by a recognition model training module in advance, wherein the target license plate recognition model comprises a target feature extraction network, a target region candidate localization network, a target super-resolution generation network and a target recurrent neural network.

The license plate recognition model 520 is specifically used for inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

As can be seen, in the solution provided by the embodiment of the present invention, the electronic device first obtains an image to be recognized, and obtains the license plate number in the image to be recognized and position coordinates of the license plate in the image to be recognized on the basis of the image to be recognized and the pre-trained target license plate recognition model. The process of obtaining a license plate number in the image to be recognized and position coordinates of the license plate in the image to be recognized comprises: inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image. Because in this solution, once an image to be recognized is input into the target license plate recognition model, the target license plate recognition model can output the license plate number and the position coordinates of the license plate in the image to be recognized, one realizes an end-to-end model. Moreover, computation variables such as image features can be reused without repeated computations, the model takes up less RAM and the speed of license plate recognition is greatly improved.

As an implementation of the embodiment of the present invention, the license plate recognition model 520 can comprise:

a super-resolution image generating unit (not shown in FIG. 9), configured for inputting the coordinates of the candidate box and the feature map into the target super-resolution generation network; extracting features of the license plate from a region in the feature map corresponding to the coordinates of the candidate box; generating a super-resolution license plate image based on the extracted features of the license plate.

As an implementation of the embodiment of the present invention, the recognition model training module (not shown in FIG. 9) can comprise:

a recognition model constructing unit (not shown in FIG. 9), configured for constructing an initial license plate recognition model, wherein the initial license plate recognition model comprises an initial feature extraction network, an initial region candidate localization network, an initial super-resolution generation network and an initial recurrent neural network;

an image sample obtaining unit (not shown in FIG. 9), configured for obtaining image samples, and recording position coordinates and number of the license plate in each of the image samples;

a feature map sample obtaining unit (not shown in FIG. 9), configured for inputting the image samples into the initial feature extraction network, and performing a first preset convolution operation on the image samples to obtain a feature map sample corresponding to each of the image samples;

a predicted position coordinate determining unit (not shown in FIG. 9), configured for inputting the feature map sample corresponding to each of the image samples into the initial region candidate localization network to obtain predicted position coordinates;

a first parameter adjusting unit (not shown in FIG. 9), configured for adjusting parameters of the initial feature extraction network and of the initial region candidate localization network based on the differences between the recorded position coordinates and the predicted position coordinates, and obtaining the target feature extraction network and the target region candidate localization network when the number of iterations reaches a first preset number of times;

a super-resolution image obtaining unit (not shown in FIG. 9), configured for inputting each of the image samples into the target feature extraction network to obtain a target feature map sample corresponding to each of the image samples, and inputting the target feature map samples into the target region candidate localization network to obtain target position coordinates;

a second parameter adjusting unit (not shown in FIG. 9), configured for adjusting parameters of the initial super-resolution generation network based on degree of differences between the predicted super-resolution image and the real license plate, and obtaining the target super-resolution generation network when the number of iterations reaches a second preset number of times;

a super-resolution license plate image sample obtaining unit (not shown in FIG. 9), configured for inputting a target feature map sample and target position coordinates corresponding to each of the image samples into the target super-resolution generation network to obtain a super-resolution license plate image sample corresponding to each of the image samples;

a predicted license plate number determining unit (not shown in FIG. 9), configured for inputting the super-resolution license plate image samples into the initial recurrent neural network to obtain predicted license plate numbers;

a third parameter adjusting unit (not shown in FIG. 9), configured for adjusting parameters of the initial recurrent neural network based on the degree of differences between the recorded numbers and the predicted license plate numbers, and finishing the training and obtaining the target recurrent neural network when the number of iterations reaches a third preset number of times.

As an implementation of the embodiment of the present invention, the apparatus can further comprise:

a size adjusting module (not shown in FIG. 9), configured for adjusting the size of the obtained image samples, before inputting the image samples into the initial feature extraction network, to obtain resized image samples;

the feature map sample obtaining unit can comprise:

a sample inputting subunit (not shown in FIG. 9), configured for inputting the resized image samples into the initial feature extraction network.

As an implementation of the embodiment of the present invention, the target feature extraction network can be a lightweight feature extraction convolutional neural network.

Figure 10:
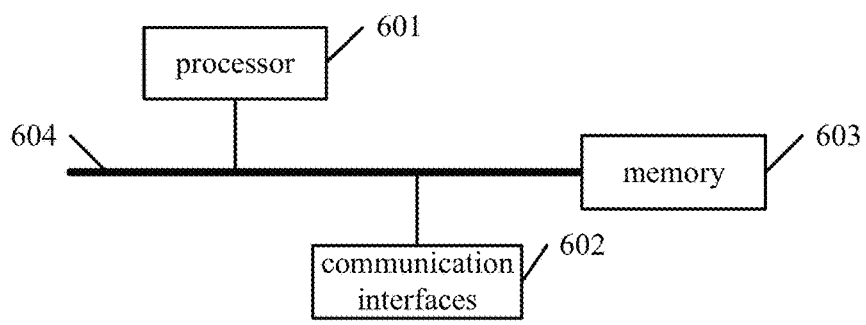
FIG. 10 is a structural schematic diagram of the structure of an electronic device provided by an embodiment of the present invention.

An embodiment of the present invention provides an electronic device, as shown in FIG. 10, comprising a processor 601, communication interfaces 602, a memory 603 and a communication bus 604, wherein the processor 601, the communication interfaces 602, and the memory 603 communicate with each other via the communication bus 604.

The memory 603 is used for storing a computer program.

The processor 601 is used for executing the program stored in the memory 603, during which, the following steps are performed:

obtaining an image to be recognized;

obtaining a number of a license plate in the image to be recognized and position coordinates of the license plate in the image to be recognized on the basis of the image to be recognized and a pre-trained target license plate recognition model, wherein the target license plate recognition model comprises a target feature extraction network, a target region candidate localization network, a target super-resolution generation network and a target recurrent neural network. The process of obtaining a license plate number in the image to be recognized and position coordinates of the license plate in the image to be recognized comprising:

inputting the image to be recognized into the target feature extraction network and performing a first preset convolution operation on the image to be recognized to obtain a feature map;

inputting the feature map into the target region candidate localization network, and performing a second preset convolution operation on the feature map to obtain coordinates of a candidate box;

inputting the coordinates of the candidate box and the feature map into the target super-resolution generation network, and generating a super-resolution license plate image based on the coordinates of the candidate box and the feature map;

inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

As can be seen, in the solution provided by the embodiment of the present invention, the electronic device first obtains an image to be recognized, and obtains the license plate number in the image to be recognized and position coordinates of the license plate in the image to be recognized on the basis of the image to be recognized and the pre-trained target license plate recognition model. The process of obtaining a license plate number in the image to be recognized and position coordinates of the license plate in the image to be recognized comprises: inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image. Because in this solution, once an image to be recognized is input into the target license plate recognition model, the target license plate recognition model can output the license plate number and position coordinates of the license plate in the image to be recognized, one realizes an end-to-end model. Moreover, computation variables such as image features can be reused without repeated computations, the model takes up less RAM and the speed of license plate recognition is greatly improved.

The communication bus described above in the electronic device can be a peripheral component interconnect (PCI) bus or an extended industry standard architecture (EISA) bus or the like. The communication bus can include an address bus, a data bus, a control bus, or the like. To facilitate representation, the communication bus is represented in the figure by only one thick line, which does not mean there is only one bus or one type of bus.

The communication interface is used for communications between the electronic device described above and other devices.

The memory can include a random access memory (RAM), or may include a non-volatile memory (NVM), for example at least one disk memory. Optionally, the memory can also be at least one storage device located away from the processor described above.

The processor described above may be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Inputting the coordinates of the candidate box and the feature map into the target super-resolution generation network and generating a super-resolution license plate image based on the coordinates of the candidate box and the feature map described above, can comprise:

inputting the coordinates of the candidate box and the feature map into the target super-resolution generation network;

extracting features of the license plate from a region in the feature map corresponding to the coordinates of the candidate box;

generating a super-resolution license plate image based on the extracted features of the license plate.

The process of training the target license plate recognition model described above can comprise:

constructing an initial license plate recognition model, wherein the initial license plate recognition model comprises an initial feature extraction network, an initial region candidate localization network, an initial super-resolution generation network and an initial recurrent neural network;

obtaining image samples, and recording position coordinates and number of the license plate in each of the image samples;

inputting the image samples into the initial feature extraction network, and performing a first preset convolution operation on the image samples to obtain a feature map sample corresponding to each of the image samples;

inputting the feature map sample corresponding to each of the image samples into the initial region candidate localization network to obtain predicted position coordinates;

adjusting parameters of the initial feature extraction network and of the initial region candidate localization network based on the differences between the recorded position coordinates and the predicted position coordinates, and obtaining the target feature extraction network and the target region candidate localization network when the number of iterations reaches a first preset number of times;

inputting each of the image samples into the target feature extraction network to obtain a target feature map sample corresponding to each of the image samples, and inputting the target feature map samples into the target region candidate localization network to obtain target position coordinates;

adjusting parameters of the initial super-resolution generation network based on the degree of differences between the predicted super-resolution image and the real license plate, and obtaining the target super-resolution generation network when the number of iterations reaches a second preset number of times;

inputting a target feature map sample and target position coordinates corresponding to each of the image samples into the target super-resolution generation network to obtain a super-resolution license plate image sample corresponding to each of the image samples;

inputting the super-resolution license plate image samples into the initial recurrent neural network to obtain predicted license plate numbers;

adjusting parameters of the initial recurrent neural network based on the degree of differences between the recorded numbers and the predicted license plate numbers, and finishing the training and obtaining the target recurrent neural network when the number of iterations reaches a third preset number of times.

Before inputting the image samples into the initial feature extraction network described above, the method described above can further comprise:

adjusting the size of the obtained image samples to obtain resized image samples.

Inputting the image samples into the initial feature extraction network comprises:

inputting the resized image samples into the initial feature extraction network.

The target feature extraction network described above can be a lightweight feature extraction convolutional neural network.

An embodiment of the invention provides a computer-readable storage medium having a computer program stored therein that, when executed by a processor, implements the following steps:

obtaining an image to be recognized;

obtaining a number of a license plate in the image to be recognized and position coordinates of the license plate in the image to be recognized on the basis of the image to be recognized and a pre-trained target license plate recognition model, wherein the target license plate recognition model comprises a target feature extraction network, a target region candidate localization network, a target super-resolution generation network and a target recurrent neural network. The process of obtaining a license plate number in the image to be recognized and position coordinates of the license plate in the image to be recognized comprising:

inputting the image to be recognized into the target feature extraction network and performing a first preset convolution operation on the image to be recognized to obtain a feature map;

inputting the feature map into the target region candidate localization network, and performing a second preset convolution operation on the feature map to obtain coordinates of a candidate box;

inputting the coordinates of the candidate box and the feature map into the target super-resolution generation network, and generating a super-resolution license plate image based on the coordinates of the candidate box and the feature map;

inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

As can be seen, in the solution provided by the embodiment of the present invention, when executing the computer program described above, the processor first obtains an image to be recognized, and obtains the license plate number in the image to be recognized and position coordinates of the license plate in the image to be recognized on the basis of the image to be recognized and the pre-trained target license plate recognition model. The process of obtaining a license plate number in the image to be recognized and position coordinates of the license plate in the image to be recognized comprises: inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image. Because in this solution, once an image to be recognized is input into the target license plate recognition model, the target license plate recognition model can output the license plate number and position coordinates of the license plate in the image to be recognized, one realizes an end-to-end model. Moreover, computation variables such as image features can be reused without repeated computations, the model takes up less RAM and the speed of license plate recognition is greatly improved.

Inputting the coordinates of the candidate box and the feature map into the target super-resolution generation network and generating a super-resolution license plate image based on the coordinates of the candidate box and the feature map described above, can comprise:

inputting the coordinates of the candidate box and the feature map into the target super-resolution generation network;
 extracting features of the license plate from a region in the feature map corresponding to the coordinates of the candidate box;
 generating a super-resolution license plate image based on the extracted features of the license plate.

The process of training the target license plate recognition model described above can comprise:

constructing an initial license plate recognition model, wherein the initial license plate recognition model comprises an initial feature extraction network, an initial region candidate localization network, an initial super-resolution generation network and an initial recurrent neural network;
 obtaining image samples, and recording position coordinates and number of the license plate in each of the image samples;
 inputting the image samples into the initial feature extraction network, and performing a first preset convolution operation on the image samples to obtain a feature map sample corresponding to each of the image samples;
 inputting the feature map sample corresponding to each of the image samples into the initial region candidate localization network to obtain predicted position coordinates;
 adjusting parameters of the initial feature extraction network and of the initial region candidate localization network based on the differences between the recorded position coordinates and the predicted position coordinates, and obtaining the target feature extraction network and the target region candidate localization network when the number of iterations reaches a first preset number of times;
 inputting each of the image samples into the target feature extraction network to obtain a target feature map sample corresponding to each of the image samples, and inputting the target feature map samples into the target region candidate localization network to obtain target position coordinates;
 adjusting parameters of the initial super-resolution generation network based on the degree of differences between the predicted super-resolution image and the real license plate, and obtaining the target super-resolution generation network when the number of iterations reaches a second preset number of times;
 inputting the target feature map sample and target position coordinates corresponding to each of the image samples into the target super-resolution generation network to obtain a super-resolution license plate image sample corresponding to each of the image samples;
 inputting the super-resolution license plate image samples into the initial recurrent neural network to obtain predicted license plate numbers;
 adjusting parameters of the initial recurrent neural network based on the degree of differences between the recorded numbers and the predicted license plate numbers, and finishing the training and obtaining the target recurrent neural network when the number of iterations reaches a third preset number of times.

Before inputting the image samples into the initial feature extraction network described above, the method described above can further comprise:

adjusting the size of the obtained image samples to obtain resized image samples.

Inputting the image samples into the initial feature extraction network comprises:

inputting the resized image samples into the initial feature extraction network.

The target feature extraction network described above can be a lightweight feature extraction convolutional neural network.

It should be noted that for the embodiments of the apparatus, the electronic device and the computer-readable storage medium described above, since they are essentially similar to the embodiment of the method, the description thereof is relatively simple; one can refer to the parts of the description of the embodiment of the method for the relevant parts.

It should be further noted that the relationship terms herein such as "first", "second" and the like, if any, are only used for distinguishing one entity or operation from another entity or operation, but do not necessarily require or imply that there is an actual relationship or order between these entities or operations. Moreover, the terms "include", "comprise" or any other variants thereof are intended to cover a non-exclusive inclusion, so that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices that include these elements.

Various embodiments of the description are described in an inter-related way, and the same or similar parts in various embodiments can be referred to one another, the parts emphasized for an embodiment are different from other embodiments. Especially for embodiments of a system, since they are similar to the embodiment of a method, the description thereof is relatively simple; one need only the parts of the description of embodiments of the method for the relevant parts.

The embodiments described above are just preferred embodiments of the present invention, and not intended to limit the scope of protection of the invention. Any modifications, equivalents, improvements or the like within the spirit and principle of the invention is included in the scope of protection of the present invention.

What is claimed is:

1. An end-to-end lightweight method for license plate recognition, comprising:

obtaining an image to be recognized;

obtaining a number of a license plate in the image to be recognized and position coordinates of the license plate in the image to be recognized on the basis of the image to be recognized and a pre-trained target license plate recognition model, wherein the target license plate recognition model comprises a target feature extraction network, a target region candidate localization network, a target super-resolution generation network and a target recurrent neural network, the process of obtaining a number of a license plate in the image to be recognized and position coordinates of the license plate in the image to be recognized comprising:

inputting the image to be recognized into the target feature extraction network and performing a first preset convolution operation on the image to be recognized to obtain a feature map;

inputting the feature map into the target region candidate localization network, and performing a second preset convolution operation on the feature map to obtain coordinates of a candidate box;

inputting the coordinates of the candidate box and the feature map into the target super-resolution generation network, and generating a super-resolution license plate image based on the coordinates of the candidate box and the feature map;

inputting the super-resolution license plate image and the coordinates of the candidate box into the target recurrent neural network, and obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

2. The method of claim 1, wherein inputting the coordinates of the candidate box and the feature map into the target super-resolution generation network and generating a super-resolution license plate image based on the coordinates of the candidate box and the feature map comprises:

inputting the coordinates of the candidate box and the feature map into the target super-resolution generation network;

extracting features of the license plate from a region in the feature map corresponding to the coordinates of the candidate box;

generating a super-resolution license plate image based on the extracted features of the license plate.

3. The method of claim 1, wherein the process of training the target license plate recognition model comprises:

constructing an initial license plate recognition model, wherein the initial license plate recognition model comprises an initial feature extraction network, an initial region candidate localization network, an initial super-resolution generation network and an initial recurrent neural network;

obtaining image samples, and recording position coordinates and number of the license plate in each of the image samples;

inputting the image samples into the initial feature extraction network, and performing a first preset convolution operation on the image samples to obtain a feature map sample corresponding to each of the image samples;

inputting the feature map sample corresponding to each of the image samples into the initial region candidate localization network to obtain predicted position coordinates;

adjusting parameters of the initial feature extraction network and of the initial region candidate localization network based on differences between the recorded position coordinates and the predicted position coordinates, and obtaining the target feature extraction network and the target region candidate localization network when the number of iterations reaches a first preset number of times;

inputting each of the image samples into the target feature extraction network to obtain a target feature map sample corresponding to each of the image samples, and inputting the target feature map samples into the target region candidate localization network to obtain target position coordinates;

inputting the target feature map samples and the target position coordinates into the initial super-resolution generation network to obtain predicted super-resolution images;

adjusting parameters of the initial super-resolution generation network based on the degree of differences between the predicted super-resolution images and real license plates, and obtaining the target super-resolution generation network when the number of iterations reaches a second preset number of times;

inputting the target feature map sample and target position coordinates corresponding to each of the image samples into the target super-resolution generation network to obtain a super-resolution license plate image sample corresponding to each of the image samples;

inputting the super-resolution license plate image samples into the initial recurrent neural network to obtain predicted license plate numbers;

adjusting parameters of the initial recurrent neural network based on the degree of differences between the recorded numbers and the predicted license plate numbers, and finishing the training and obtaining the target recurrent neural network when the number of iterations reaches a third preset number of times.

4. The method of claim 2, wherein the process of training the target license plate recognition model comprises:

constructing an initial license plate recognition model, wherein the initial license plate recognition model comprises an initial feature extraction network, an initial region candidate localization network, an initial super-resolution generation network and an initial recurrent neural network;

obtaining image samples, and recording position coordinates and number of the license plate in each of the image samples;

inputting the image samples into the initial feature extraction network, and performing a first preset convolution operation on the image samples to obtain a feature map sample corresponding to each of the image samples;

inputting the feature map sample corresponding to each of the image samples into the initial region candidate localization network to obtain predicted position coordinates;

adjusting parameters of the initial feature extraction network and of the initial region candidate localization network based on differences between the recorded position coordinates and the predicted position coordinates, and obtaining the target feature extraction network and the target region candidate localization network when the number of iterations reaches a first preset number of times;

inputting each of the image samples into the target feature extraction network to obtain a target feature map sample corresponding to each of the image samples, and inputting the target feature map samples into the target region candidate localization network to obtain target position coordinates;

inputting the target feature map samples and the target position coordinates into the initial super-resolution generation network to obtain predicted super-resolution images;

adjusting parameters of the initial super-resolution generation network based on the degree of differences between the predicted super-resolution images and real license plates, and obtaining the target super-resolution generation network when the number of iterations reaches a second preset number of times;

inputting the target feature map sample and target position coordinates corresponding to each of the image samples into the target super-resolution generation network to obtain a super-resolution license plate image sample corresponding to each of the image samples;

inputting the super-resolution license plate image samples into the initial recurrent neural network to obtain predicted license plate numbers;

adjusting parameters of the initial recurrent neural network based on the degree of differences between the recorded numbers and the predicted license plate numbers, and finishing the training and obtaining the target recurrent neural network when the number of iterations reaches a third preset number of times.

5. The method of claim 3, wherein before inputting the image samples into the initial feature extraction network, the method further comprises:

adjusting sizes of the obtained image samples to obtain resized image samples;

wherein inputting the image samples into the initial feature extraction network comprises:

inputting the resized image samples into the initial feature extraction network.

6. The method of claim 1, wherein the target feature extraction network is a lightweight feature extraction convolutional neural network.

7. The method of claim 2, wherein the target feature extraction network is a lightweight feature extraction convolutional neural network.

8. The method of claim 3, wherein the target feature extraction network is a lightweight feature extraction convolutional neural network.

9. The method of claim 4, wherein the target feature extraction network is a lightweight feature extraction convolutional neural network.

10. The method of claim 5, wherein the target feature extraction network is a lightweight feature extraction convolutional neural network.

11. An end-to-end lightweight apparatus for license plate recognition, comprising:

an image to be recognized obtaining module, configured for obtaining an image to be recognized;

a license plate recognition model, configured for obtaining a license plate number in the image to be recognized and position coordinates of the license plate in the image to be recognized on the basis of the image to be recognized and a target license plate recognition model that has been trained by a recognition model training model in advance, wherein the target license plate recognition model comprises a target feature extraction network, a target region candidate localization network, a target super-resolution generation network and a target recurrent neural network;

wherein the license plate recognition model is specifically configured for inputting the image to be recognized into the target feature extraction network and performing a first preset convolution operation on the image to be recognized to obtain a feature map; inputting the feature map into the target region candidate localization network, and performing a second preset convolution operation on the feature map to obtain coordinates of a candidate box; inputting the coordinates of the candidate box and the feature map into the target super-resolution generation network, and generating a super-resolution license plate image based on the coordinates of the candidate box and the feature map; inputting the super-resolution license plate image and the coordinates of the candidate box into the target recurrent neural network, obtaining the number of the license plate in the image to be recognized based on the super-resolution license plate image and correspondence between features of the license plate and characters contained in the target recurrent neural network, and outputting the number, the coordinates of the candidate box and the super-resolution license plate image.

12. The apparatus of claim 11, wherein the license plate recognition model comprises:

a super-resolution image generating unit, configured for inputting the coordinates of the candidate box and the feature map into the target super-resolution generation network; extracting features of the license plate from a region in the feature map corresponding to the coordinates of the candidate box; generating a super-resolution license plate image based on the extracted features of the license plate.

13. The apparatus of claim 11, wherein the recognition model training module comprises:

a recognition model constructing unit, configured for constructing an initial license plate recognition model, wherein the initial license plate recognition model comprises an initial feature extraction network, an initial region candidate localization network, an initial super-resolution generation network and an initial recurrent neural network;

an image sample obtaining unit, configured for obtaining image samples, and recording position coordinates and number of the license plate in each of the image samples;

a feature map sample obtaining unit, configured for inputting the image samples into the initial feature extraction network, and performing a first preset convolution operation on the image samples to obtain a feature map sample corresponding to each of the image samples;

a predicted position coordinate determining unit, configured for inputting the feature map sample corresponding to each of the image samples into the initial region candidate localization network to obtain predicted position coordinates;

a first parameter adjusting unit, configured for adjusting parameters of the initial feature extraction network and of the initial region candidate localization network based on differences between the recorded position coordinates and the predicted position coordinates, and obtaining the target feature extraction network and the target region candidate localization network when the number of iterations reaches a first preset number of times;
a super-resolution image obtaining unit, configured for inputting the target feature map sample and target position coordinates corresponding to each of the image samples into the target super-resolution generation network to obtain a super-resolution license plate image sample corresponding to each of the image samples;
a second parameter adjusting unit, configured for adjusting parameters of the initial super-resolution generation network based on the degree of differences between the predicted super-resolution images and real license plates, and obtaining the target super-resolution generation network when the number of iterations reaches a second preset number of times;
a super-resolution license plate image sample obtaining unit, configured for inputting the feature map sample corresponding to each of the image samples into the target super-resolution generation network to obtain a super-resolution license plate image sample corresponding to each of the image samples;
a predicted license plate number determining unit, configured for inputting the super-resolution license plate image samples into the initial recurrent neural network to obtain predicted license plate numbers;
a third parameter adjusting unit, configured for adjusting parameters of the initial recurrent neural network based on the degree of differences between the recorded numbers and the predicted license plate numbers, and finishing the training and obtaining the target recurrent neural network when the number of iterations reaches a third preset number of times.

14. The apparatus of claim 13, wherein the apparatus further comprises:
a size adjusting module, configured for adjusting sizes of the obtained image samples, before inputting the image samples into the initial feature extraction network, to obtain resized image samples;
the feature map sample obtaining unit comprises:
a sample inputting subunit, configured for inputting the resized image samples into the initial feature extraction network.

15. The apparatus of claim 11, wherein the target feature extraction network is a lightweight feature extraction convolutional neural network.

16. The apparatus of claim 12, wherein the target feature extraction network is a lightweight feature extraction convolutional neural network.

17. The apparatus of claim 13, wherein the target feature extraction network is a lightweight feature extraction convolutional neural network.

18. The apparatus of claim 14, wherein the target feature extraction network is a lightweight feature extraction convolutional neural network.

* * * * *